Patented Feb. 27, 1945

2,370,142

UNITED STATES PATENT OFFICE 2,370,142

BETA-CARBAMYLETHYL NITRO ALKANES

Herman A. Bruson, Philadelphia, Pa., assignor to
The Resinous Products & Chemical Company,
Philadelphia, Pa., a corporation of Delaware No Drawing. Application March 16, 1943,
Serial No. 479,337

18 Claims. (Cl. 260—561)

This invention relates to beta-carbamyl ethyl derivatives of organic nitro compounds and to a method for their preparation.

It has been found that acrylamide reacts in the presence of an alkaline condensing agent with an organic compound having an aliphatic carbon atom which is contiguous to a nitro group and which bears at least one hydrogen atom. By this reaction one or more of the active hydrogen atoms on said carbon atom is or are replaced by one or more beta-carbamyl ethyl radicals. The reaction is conveniently formulated as follows:

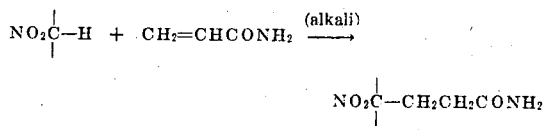

If several hydrogens are present on the carbon atom which is alpha to the nitro group, several —CH₂CH₂CONH₂ groups may be joined to this same carbon atom. On the other hand in the case of polynitro compounds one or more beta-carbamyl ethyl radicals may be joined to each of the alpha-carbon atoms, replacing one or more hydrogen atoms originally attached thereto.

It will be evident that the nitro compounds may be primary or secondary and that mono- or polynitro compounds may be used. While the most useful reactants are the nitro-paraffins, there may also be used any nitro aliphatic compounds having neutral substituents, including aryl substituted or cycloalkyl substituted nitro-paraffins. Compounds of particular interest include nitromethane, nitroethane, 1-nitropropane, 2-nitropropane, the nitrobutanes, the nitropentanes, the nitrohexanes, phenyl nitromethane, nitrocyclohexane, nitroanthrone, 1,3-dinitro-2,2-dimethyl propane, and higher nitro-paraffins, which, as is known, are conveniently prepared from aldehydes and lower nitro-paraffins to give hydroxynitro compounds, which may be used themselves or which may be reduced to the nitro-paraffins.

As alkaline condensing agent, there may be used one or more of such strongly alkaline compounds as the following: Oxides, hydroxides, amides, hydrides, or alcoholates of the alkali metals, hydroxides or hydrides of the alkaline earth metals, the alkali or alkaline earth metals themselves, strongly basic nonmetallic hydroxides, such as the quaternary ammonium hydroxides, etc. Typical useful alkaline condensing agents are sodium hydroxide, potassium hydroxide, sodium methylate, sodium oxide, sodium amide, benzyl trimethyl ammonium hydroxide, dibenzyl dimethyl ammonium hydroxide, tetramethyl ammonium hydroxide, etc. The quantity of alkaline condensing agent used is small, amounts of the order of one-half to ten percent of the weight of the reactants being generally sufficient. If desired, the catalyst may be added to the reaction system dissolved or suspended in a solvent such as water, a tertiary alcohol, a hydrocarbon, such as benzene or toluene, an ether, including dioxane, or in any medium which is less reactive toward the acrylamide than the nitro-compound.

The reaction between acrylamide and primary or secondary nitro compound occurs at temperatures as low as 10° C. to 30° C., but is more rapidly completed at temperatures up to about 80° C. The preferred reaction range is from about 30° to about 70° C. The resulting products can usually be crystallized. In many cases they are highly soluble in both water and organic solvent and are, therefore, themselves useful solvents for many other compounds.

The products are useful as intermediates for the preparation of corresponding nitro-carboxylic acids, as by hydrolysis, nitro-carboxylic esters, as by reaction with an alcohol and hydrolyzing agent such as sulfuric acid, nitro-amines, nitro-nitriles, diamines and other polyamines, by well known reactions with either the nitro-group, the carbamyl group, or both groups, the groups being of sufficient difference in activity to allow reactions with one group in preference to the other, when so desired. The compounds and their derivatives are useful in the preparation of resins, drugs, and plasticizers.

The following examples illustrate this invention, the parts being by weight.

Example 1

A mixture consisting of 35.5 parts of pure acrylamide, 100 parts of tertiary butyl alcohol, 5 parts of aqueous 40% trimethyl benzyl ammonium hydroxide and 26.7 parts of 2-nitropropane was stirred at 50° C. for two hours, then neutralized with dilute hydrochloric acid, and evaporated to dryness under reduced pressure at 90° C. A crystalline residue resulted, amounting to 61 parts. This was recrystallized from water. The product, 2-(beta-carbamylethyl)-2-nitropropane,

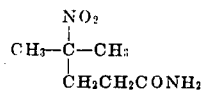

formed colorless needles having a melting point of 81° C. and an analysis as follows:

Found: C, 44.9%; H, 7.66%; N, 17.64%
Theory: C, 45.0%; H, 7.51%; N, 17.5%

Example 2

A mixture of 71 parts of acrylamide, 150 parts of tertiary butyl alcohol, 7 parts of aqueous 40% trimethyl benzyl ammonium hydroxide, and 37.5 parts of nitroethane was stirred at 60° C. for two hours, then evaporated to dryness under reduced pressure at 90° C. There was obtained a crystalline residue in an amount of 90 parts. It consisted essentially of gamma-nitro-gamma-methyl pimelic diamide:

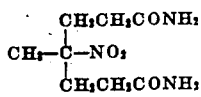

together with a small amount of gamma-nitro-valeramide:

Example 3

A mixture of 71 parts of acrylamide, 150 parts of tertiary butyl alcohol, 7 parts of 30% methanolic potassium hydroxide, and 20.4 parts of nitromethane was stirred at 45°–50° C. for three hours, then neutralized with dilute hydrochloric acid and evaporated to dryness under reduced pressure at 90° C. A crystalline product was obtained which amounted to 76 parts. It consisted essentially of tri-(beta-carbamylethyl)-nitromethane

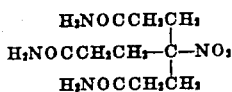

The mono- and di-beta-carbamylethyl derivatives are also formed to some extent.

By the same general procedure there may be reacted in the presence of an alkaline condensing agent acrylamide and 1-nitropropane to form

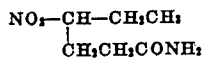

and

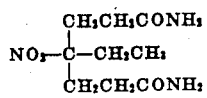

or acrylamide and other nitro alkane or nitro alkane having a neutral substituent, such as the acylnitro-paraffins, the phenyl-substituted nitroparaffins, or the hydroxy nitro-paraffins. Hydroxides of lithium, sodium, potassium, or other alkali metal or of an alkaline earth metal, such as barium, may be used in place of the quaternary ammonium or potassium hydroxide or any of the other alkaline catalysts enumerated above. Some of the less active alkaline condensing agents are of particular value when it is desired to introduce only a single substituent on a methylene or methyl group.

I claim:

1. A method for preparing beta-carbamylethyl derivatives of nitro alkanes having at least one hydrogen atom attached to a carbon atom which is alpha to a nitro group, which comprises reacting by adding together acrylamide and said nitro alkane in the presence of an alkaline condensing agent.

2. A method for preparing beta-carbamylethyl nitro alkanes, which comprises reacting together between about 10° C. and about 80° C. in the presence of an alkaline catalyst in an amount between about 0.5% and about 10% by weight of the reactants acrylamide and a nitro alkane having at least one reactive hydrogen atom on a carbon atom contiguous to the nitro group.

3. A method for preparing beta-carbamylethyl nitro alkanes, which comprises reacting between about 30° C. and about 70° C. in the presence of a solvent and in the presence of an alkaline condensing agent in an amount between about 0.5% and about 10% by weight of the reactants acrylamide and a nitro alkane having at least one reactive hydrogen atom on a carbon atom contiguous to a nitro group.

4. A method for preparing gamma-methyl-gamma-nitro pimelic diamide, which comprises reacting together in the presence of an alkaline condensing agent between about 30° C. and about 70° C. acrylamide and nitroethane.

5. A method for preparing 2-(beta-carbamylethyl)-2-nitropropane, which comprises reacting together in the presence of an alkaline condensing agent between about 30° C. and about 70° C. acrylamide and 2-nitropropane.

6. A method for preparing a beta-carbamylethyl derivative of nitromethane, which comprises reacting together in the presence of an alkaline condensing agent between about 30° C. and about 70° C. acrylamide and nitromethane.

7. As a new compound, a beta-carbamylethyl nitro-paraffin, in which at least one beta-carbamylethyl group is attached to the carbon atom contiguous to the nitro group.

8. As a new compound, a nitro alkane having at least one beta-carbamylethyl group attached to the carbon atom carrying the nitro group.

9. As a new compound, a nitroalkane substituted with a plurality of beta-carbamylethyl groups on the carbon atom carrying the nitro group.

10. As a new compound, gamma-methyl-gamma-nitropimelic diamide.

11. As a new compound, 2-(beta-carbamylethyl)-2-nitro-propane.

12. As a new compound, a carbamylethyl nitromethane.

13. As a new compound, tri-(beta-carbamylethyl) nitro-methane.

14. A method for preparing beta-carbamylethyl derivatives of a nitro alkane having at least one hydrogen atom attached to a carbon atom which is alpha to a nitro group, which comprises reacting by adding together acrylamide and said nitro alkane in a solvent therefor in the presence of an alkaline condensing agent.

15. A method for preparing a beta-carbamylethyl derivative of a nitro alkane having at least two hydrogen atoms attached to a carbon atom having a nitro group joined thereto, which comprises reacting by adding together more than one molecular proportion of acrylamide and one molecular proportion of said nitro alkane in the presence of an alkaline condensing agent.

16. A method for preparing a beta-carbamylethyl derivative of a nitro alkane having at least two hydrogen atoms attached to a carbon atom having a nitro group joined thereto, which comprises reacting by adding together more than one molecular proportion of acrylamide and one molecular proportion of said nitro alkane in a solvent therefor and in the presence of an alkaline condensing agent.

17. A method for preparing beta-carbamylethyl derivatives of a nitro alkane having at least one hydrogen atom attached to a carbon atom having a nitro group joined thereto, which comprises reacting by adding together acrylamide and said nitro alkane in the presence of a quaternary ammonium hydroxide.

18. A method for preparing beta-carbamylethyl derivatives of a nitro alkane having at least one hydrogen atom attached to a carbon atom having a nitro group joined thereto, which comprises reacting by adding together acrylamide and said nitro alkane in a solvent therefor and in the presence of an alkaline condensing agent.

HERMAN A. BRUSON.